(12) United States Patent
Lair (10) Patent No.: US 7,264,203 B2
(45) Date of Patent: Sep. 4, 2007

(54) SPIDER ACTUATED THRUST REVERSER

(75) Inventor: Jean-Pierre Lair, San Antonio, TX (US)

(73) Assignee: The Nordam Group, Inc., Tulsa, OK (US)

( * ) Notice: Subject to any disclaimer, the term of this patent is extended or adjusted under 35 U.S.C. 154(b) by 0 days.

(21) Appl. No.: 10/955,662

(22) Filed: Sep. 30, 2004

(65) Prior Publication Data

US 2005/0151012 A1 Jul. 14, 2005

Related U.S. Application Data

(60) Provisional application No. 60/508,504, filed on Oct. 2, 2003.

(51) Int. Cl.
*F02K 1/54* (2006.01)
(52) U.S. Cl. .................................................. 244/110 B
(58) Field of Classification Search ............... 244/12.4, 244/12.5, 110 B; 239/265.37, 265.39; 60/226.2, 60/230, 223
See application file for complete search history.

(56) References Cited

U.S. PATENT DOCUMENTS

| | | | |
|---|---|---|---|
| 3,024,605 A | 3/1962 | Nash | |
| 3,503,211 A | 3/1970 | Medawar et al. | |
| 3,614,037 A | 10/1971 | Vdolek | |
| 3,779,010 A | 12/1973 | Chamay et al. | |
| 3,829,020 A * | 8/1974 | Stearns | 239/265.13 |
| 4,030,290 A * | 6/1977 | Stachowiak | 60/226.2 |
| 4,147,029 A | 4/1979 | Sargisson | |
| 4,922,713 A | 5/1990 | Barbarin et al. | |
| 5,655,360 A | 8/1997 | Butler | |
| 5,779,192 A | 7/1998 | Metezeau et al. | |
| 5,826,823 A | 10/1998 | Lymons et al. | |
| 5,908,159 A * | 6/1999 | Rudolph | 239/265.17 |
| 5,913,476 A | 6/1999 | Gonidec et al. | |
| 6,079,201 A * | 6/2000 | Jean | 60/226.2 |
| 6,167,694 B1 * | 1/2001 | Davies | 60/226.2 |
| 6,487,846 B1 * | 12/2002 | Chakkera et al. | 60/226.2 |
| 6,568,172 B2 | 5/2003 | Jannetta et al. | |
| 6,845,607 B2 * | 1/2005 | Lair | 60/263 |
| 6,845,946 B2 * | 1/2005 | Lair | 244/110 B |
| 6,895,742 B2 * | 5/2005 | Lair et al. | 60/226.2 |
| 6,966,175 B2 * | 11/2005 | Lair | 60/226.1 |
| 6,976,352 B2 * | 12/2005 | Lair | 60/226.2 |
| 2003/0070416 A1 * | 4/2003 | Johnson et al. | 60/226.2 |
| 2004/0068978 A1 | 4/2004 | Lair et al. | |
| 2004/0079073 A1 * | 4/2004 | Ramlaoui et al. | 60/226.2 |
| 2004/0231317 A1 | 11/2004 | Dehu et al. | |
| 2005/0001095 A1 * | 1/2005 | Christensen | 244/110 B |
| 2005/0039438 A1 * | 2/2005 | Lair | 60/226.2 |
| 2005/0086927 A1 * | 4/2005 | Lair et al. | 60/226.2 |
| 2005/0102996 A1 * | 5/2005 | Lair | 60/226.2 |
| 2005/0103933 A1 * | 5/2005 | Lair | 244/110 B |
| 2005/0126174 A1 * | 6/2005 | Lair | 60/771 |
| 2005/0151012 A1 * | 7/2005 | Lair | 244/110 B |
| 2006/0101805 A1 * | 5/2006 | Greco | 60/226.2 |
| 2006/0101806 A1 * | 5/2006 | Ahrendt | 60/226.2 |

\* cited by examiner

*Primary Examiner*—Robert P. Swiatek
*Assistant Examiner*—Stephen Holzen
(74) *Attorney, Agent, or Firm*—Francis L. Conte (57) ABSTRACT

A thrust reverser includes reverser doors circumferentially spaced around a nacelle. An arcuate yoke is disposed coaxially around the nacelle. An actuator is mounted tangentially to the yoke for rotary movement thereof. Actuator rods join the doors to the yoke for simultaneous deployment of the doors as the yoke is rotated.

21 Claims, 8 Drawing Sheets

SPIDER ACTUATED THRUST REVERSER

This application claims the benefit of U.S. Provisional Application 60/508,504; filed Oct. 2, 2003.

BACKGROUND OF THE INVENTION

The present invention relates generally to aircraft engines, and, more specifically, to thrust reversers therein.

A typical turbofan aircraft engine includes a fan powered by a core engine for producing propulsion thrust for powering the aircraft in flight. The core engine typically has in serial flow communication a multistage axial compressor, annular combustor, and high pressure turbine joined to the compressor by one shaft. A second shaft joins the fan to a low pressure turbine disposed downstream from the high pressure turbine.

The engine also includes a fan nacelle surrounding the cowling or nacelle of the core engine which defines an annular bypass duct therebetween. The nacelle may be short and terminates in a fan outlet nozzle surrounding the core engine upstream from an independent core exhaust nozzle at the downstream end thereof. Or, the fan nacelle may be long and extends downstream past the core nozzle for collectively discharging both the fan bypass air and the core exhaust in a common exhaust nozzle disposed downstream therefrom.

The turbofan engine typically also includes a fan thrust reverser for providing aerodynamic braking during aircraft landing on a runway. Various types of fan thrust reversers are known in the art, one of which includes pivoting doors that block the aft travel of the fan air in the bypass duct and redirect it in the forward direction for reversing the direction of fan air thrust.

The known fan reversers have various advantages and various disadvantages relating to complexity, size, weight, and cost. And, the pivoting door fan reverser requires multiple sets of deployment actuators and linkage.

In a large turbofan engine, there may be four pivoting doors spaced around the nacelle, with each of those four doors requiring an independent deployment actuator and linkage, and the multiple doors must be deployed in unison. Accordingly, the use of multiple actuators correspondingly increases the complexity, weight, and cost of the reverser system and its control.

U.S. Pat. No. 6,895,742 assigned to the present assignee, discloses an improved bifold door thrust reverser having many advantages over typical f an thrust reversers The bifold door reverser includes outer and inner doors which are deployed in opposition for blocking and turning the fan bypass flow during thrust reverse operation. A gang of the outer doors may be deployed in unison with a common inner door, all deployed using a common actuator The outer and inner doors maintain continuity of the outer and inner skins of the nacelle when stowed, and the actuation mechanism is fully contained in the nacelle between the two skins. The bifold door reverser is relatively compact and requires relatively small stroke of the multiple actuators used therein. However, the multiple actuators and control system therefor correspondingly increases weight, cost, and complexity.

Accordingly, it is desired to further improve the bifold door thrust reverser by reducing the number of actuators required for deployment thereof.

BRIEF SUMMARY OF THE INVENTION

A thrust reverser includes reverser doors circumferentially spaced around a nacelle. An arcuate yoke is disposed coaxially around the nacelle. An actuator is mounted tangentially to the yoke for rotary movement thereof. Actuator rods join the doors to the yoke for simultaneous deployment of the doors as the yoke is rotated.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
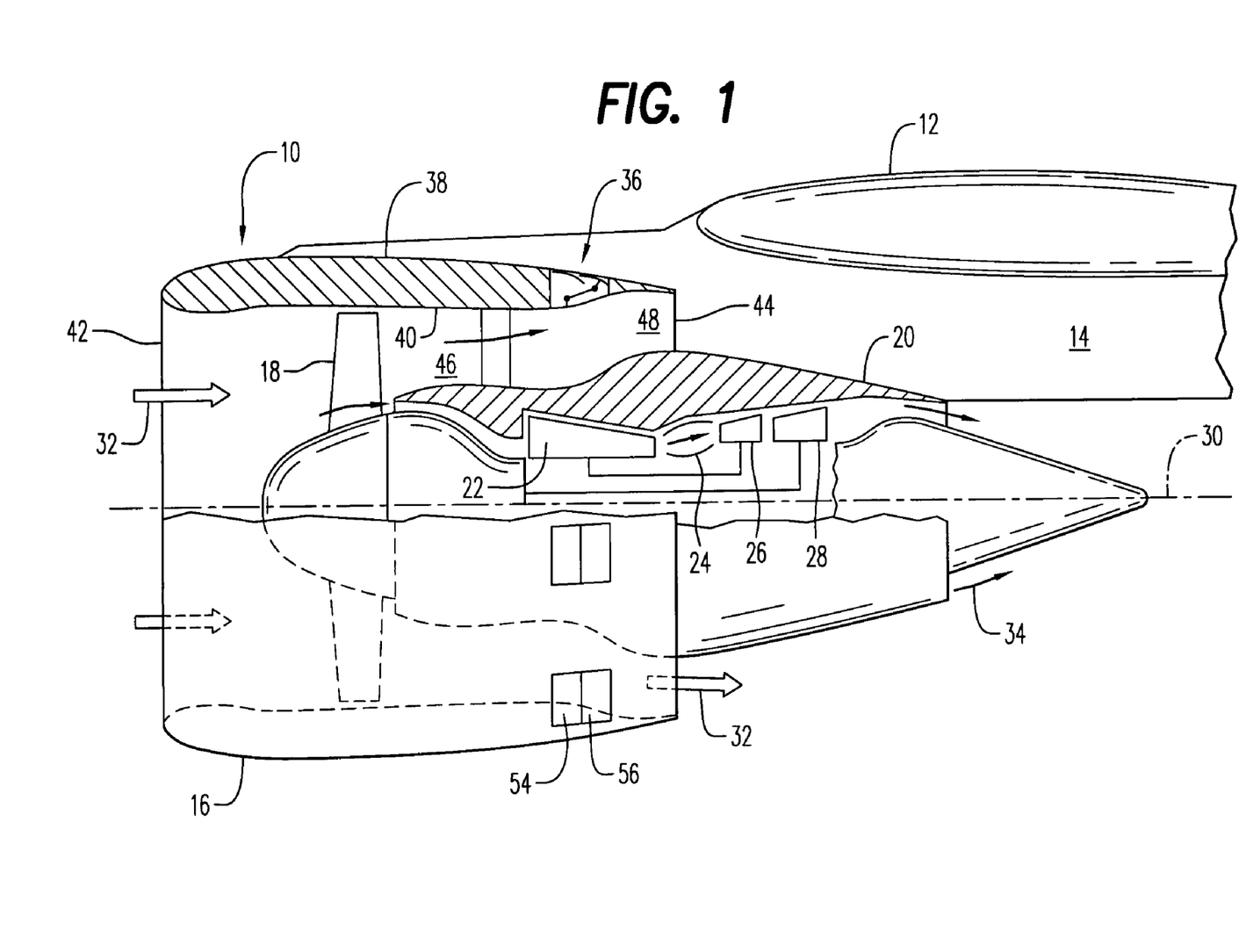
FIG. 1 is a partly sectional axial view of an exemplary turbofan aircraft gas turbine engine mounted to an aircraft wing, and including a fan thrust reverser integrated in the fan nacelle thereof.

Illustrated in FIG. 1 is a turbofan aircraft gas turbine engine 10 suitably mounted to the wing 12 of an aircraft by a supporting pylon 14. Alternatively, the engine could be mounted to the fuselage of the aircraft if desired.

The engine includes an annular fan nacelle 16 surrounding a fan 18 which is powered by a core engine surrounded by a core nacelle or cowl 20. The core engine includes in serial flow communication a multistage axial compressor 22, an annular combustor 24, a high pressure turbine 26, and a low pressure turbine 28 which are axisymmetrical about a longitudinal or axial centerline axis 30.

During operation, ambient air 32 enters the fan nacelle and flows past the fan blades into the compressor 22 for pressurization. The compressed air is mixed with fuel in the combustor 24 for generating hot combustion gases 34 which are discharged through the high and low pressure turbine 26,28 in turn. The turbines extract energy from the combustion gases and power the compressor 22 and fan 18, respectively.

A majority of the air is pressurized by the driven fan 18 for producing a substantial portion of the propulsion thrust powering the aircraft in flight. The combustion gases 34 are exhausted from the aft outlet of the core engine for providing additional thrust.

However, during landing operation of the aircraft, thrust reversal is desired for aerodynamically slowing or braking the speed of the aircraft as it decelerates along a runway. Accordingly, the turbofan engine 10 includes a fan thrust reverser 36 wholly contained in or integrated into the fan nacelle 16 for selectively reversing fan thrust during aircraft landing.

The fan thrust reverser, or simply fan reverser 36 is integrated directly into the fan nacelle 16. The fan nacelle includes radially outer and inner cowlings or skins 38,40 which extend axially from a leading edge of the nacelle defining an annular inlet 42 to an opposite trailing edge defining an annular outlet 44. The fan nacelle 16 may have any conventional configuration, and is typically formed in two generally C-shaped halves which are pivotally joined to the supporting pylon 14 for being opened during maintenance operations.

The exemplary fan nacelle illustrated in FIG. 1 is a short nacelle terminating near the middle of the core engine for discharging the pressurized fan airflow separately from and surrounding the exhaust flow 34 discharged from the aft outlet of the core engine. In alternate embodiments, the fan nacelle could be long and extend downstream of the core engine for providing a single, common outlet for both the fan air and the core exhaust.

In the exemplary embodiment illustrated in FIG. 1, the core engine is mounted concentrically inside the fan nacelle 16 by a row of supporting struts in a conventional manner. The core cowl 20 is spaced radially inwardly from the inner skin 40 of the fan nacelle to define an annular bypass duct 46 therebetween which bypasses a major portion of the fan air around the core engine during operation. The fan bypass duct terminates in an annular fan nozzle 48 at the nacelle trailing edge or outlet 44.

A particular advantage of the fan reverser 36 is that the fan nozzle 48 itself may remain fixed at the aft end of the fan nacelle surrounding the core engine. And, the fan reverser 36 may be fully integrated in the fan nacelle immediately forward or upstream from the fixed fan nozzle.

Figure 2:
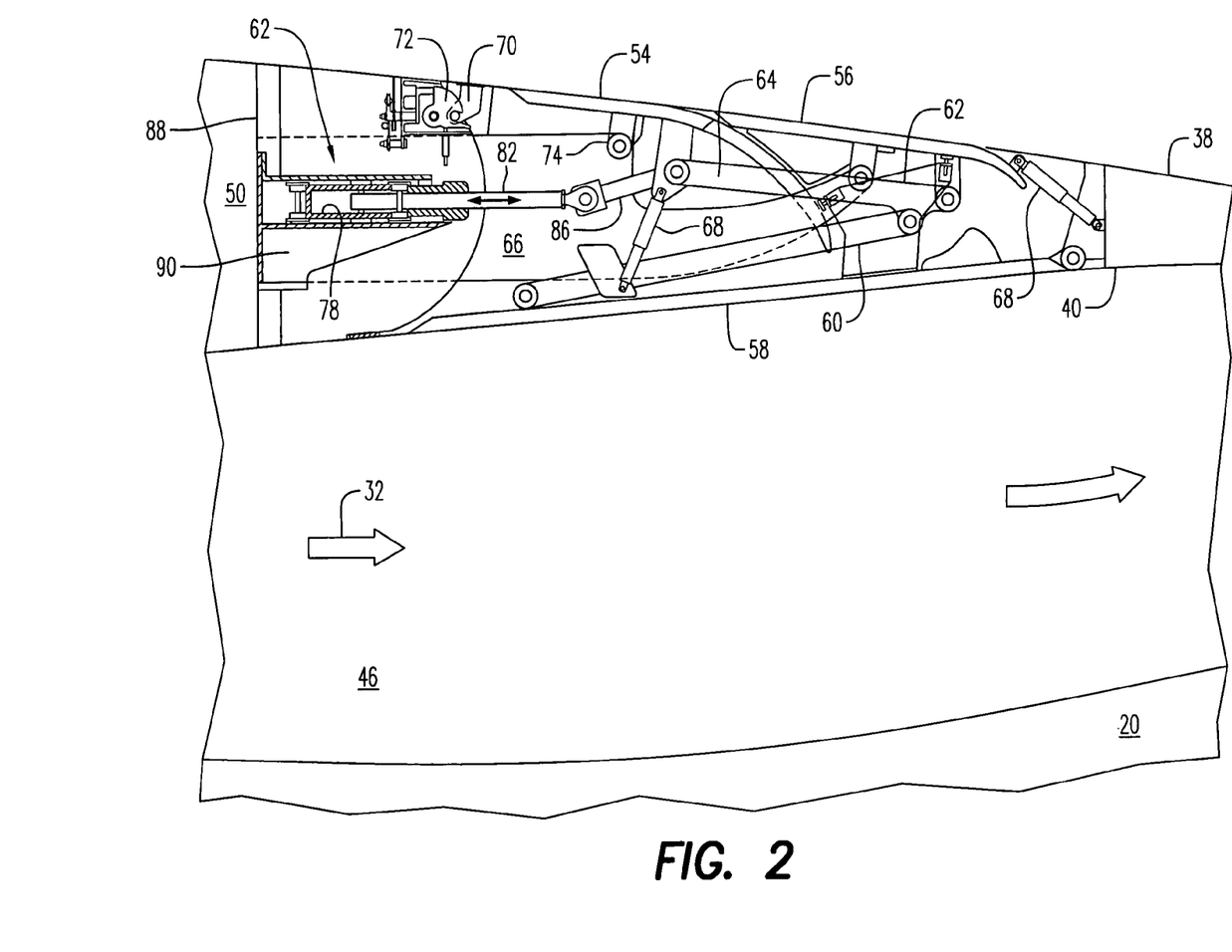
FIG. 2 is an axial sectional view of the fan reverser illustrated in FIG. 1 shown in a stowed position.
Figure 3:
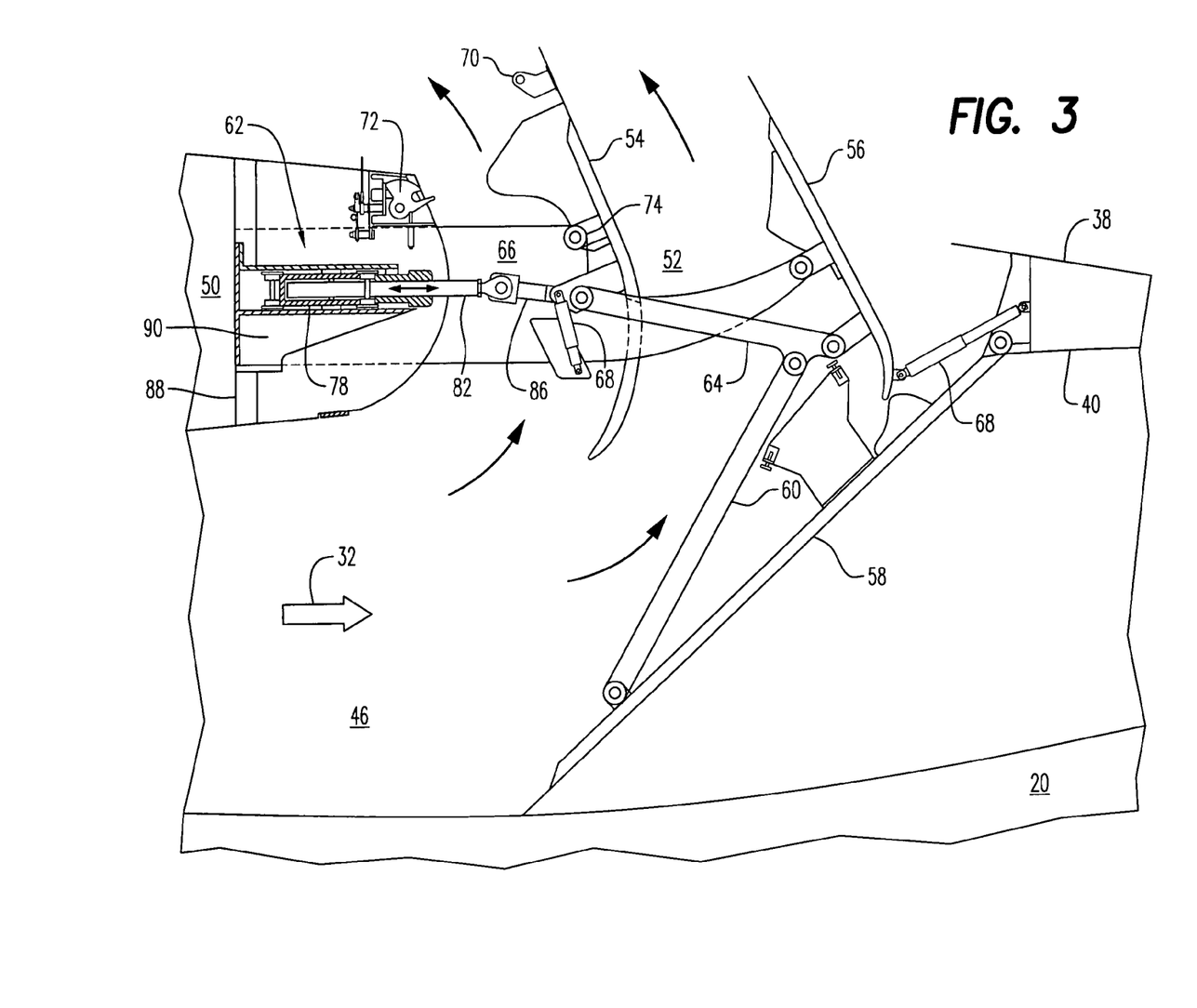
FIG. 3 is an axial sectional view of the fan reverser illustrated in FIG. 2 shown in a deployed position.

More specifically, the fan reverser is illustrated in more detail in FIGS. 2 and 3 wherein the outer and inner skins 38,40 are spaced radially apart to define an arcuate compartment or annulus 50 spaced axially forwardly from the nacelle trailing edge 44. The nacelle compartment 50 includes a flow tunnel or aperture 52 extending radially between the inner and outer skins through which the pressurized fan bypass air 32 may be discharged during thrust reverse operation.

At least one, and preferably a gang or set of radially outer louver doors 54,56 are suitably pivotally joined to the fan nacelle in the compartment 50 to close the exit end of the tunnel along the outer skin 38. Two or more of the louver doors may be axially nested together as further described hereinbelow.

A corresponding radially inner reverser or blocker door 58 is suitably pivotally joined to the fan nacelle 16 inside the compartment 50 in radial opposition with the gang of louver doors to close the inlet end of the tunnel along the inner skin 40. In the stowed closed position illustrated in FIG. 2, the inner door is folded closed generally parallel with the corresponding gang of outer doors, converging slightly to conform with the converging profile or cross section of the nacelle.

Since the fan bypass duct 46 illustrated in FIGS. 1-3 is substantially annular, the fan reverser includes corresponding groups of the louver doors 54,56 and cooperating blocker door 58 spaced circumferentially apart around the perimeter of the fan nacelle 16. For example, in each half C-duct portion of the fan nacelle, three groups of the blocker and louver doors are uniformly spaced apart from each other.

An elongate drive link 60 pivotally joins together the outer and inner doors for coordinating the simultaneous deployment thereof. A spider actuation mechanism or system 62 is suitably mounted in the nacelle compartment and joined to the doors for selective rotation thereof from the stowed position illustrated in FIG. 2 at which the doors are pivoted closed substantially flush in the outer and inner skins 38,40 respectively.

The deployed position is illustrated in FIG. 3 at which the outer doors 54,56 are pivoted open and extend radially outwardly in part from the outer skin 38, with the inner door 58 being pivoted open and extending radially inwardly in most part from the inner skin 40. The outer and inner doors are interconnected by the drive link 60 in an accordion or bifold manner in which the doors collapse or fold together in the stowed position illustrated in FIG. 2, and swing open with opposite inclinations in the deployed position illustrated in FIG. 3.

In the preferred embodiment, a pair of the outer louver doors 54,56 are arranged in axial series in the common flow tunnel 52 in axial and circumferential alignment atop the common blocker door 58 disposed therebelow. An elongate unison link 64 pivotally joins together the gang of louver doors 54 so that they may open and close simultaneously in the manner of commonly known louver windows.

Figure 4:
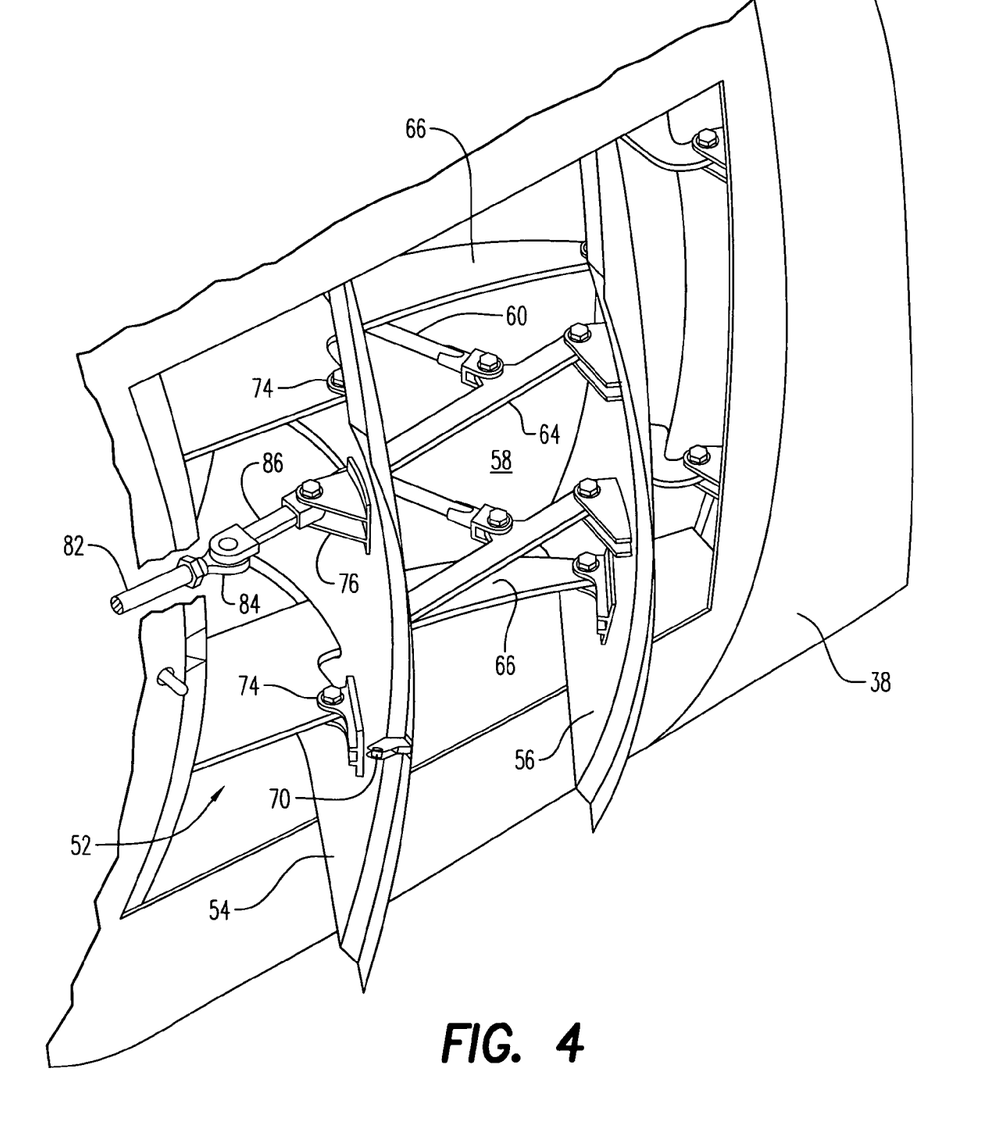
FIG. 4 is an enlarged isometric view of a representative set of the reverser doors illustrated in FIG. 1 in an exemplary embodiment.

The louver doors 54,56 and blocker door 58 may be suitably mounted to the fan nacelle in any convenient manner for effecting the improved deployment thereof as described above. For example, a pair of circumferentially spaced apart cantilevers 66 have corresponding proximal ends which are suitably fixedly mounted to the nacelle in the common compartment 50. The cantilevers are preferably thin beams circumferentially and thick radially to provide sufficient strength for supporting the louver doors therefrom while minimizing obstruction of the airflow during thrust reverse operation. As shown in FIG. 4, the two cantilevers 66 define with the two deployed louver doors a grate like those typically found in fixed cascade vanes, but using the movable louver doors.

The aft louver door 56 is suitably pivotally joined to the distal ends of the two cantilevers, with the forward louver door 54 being pivotally joined at an intermediate location on the cantilevers forward of the aft distal end thereof. In this way, the thin cantilevers support the louver doors under tension against the aerodynamic pressure loads exerted on the louver doors when deployed.

In FIG. 4 a pair of the unison links 64 are correspondingly mounted to the louver doors 54,56 axially along respective ones of the two cantilevers 66. And, two corresponding drive links 60 extend from the aft ends of the unison links to the forward ends of the blocker doors.

The interconnected bifold configuration of the louver doors 54,56 and the cooperating blocker door 58 permits the introduction of a relatively simple mechanism for self-locking or self-latching the cooperating doors in their stowed positions without the need for external power or control dedicated thereto. This self-locking capability is effected by introducing one or more substantially identical toggle links 68 suitably pivotally joined between one or both louver doors 54,56 and the supporting nacelle 16 as illustrated in FIGS. 2 and 3.

For the forward toggle link 68, its outer distal end is laterally offset axially aft in the outboard direction of its vertical toggle line in the stowed position of the forward louver door 54, and oppositely laterally offset axially forwardly in the inboard direction of its toggle line in the deployed position of the forward louver door. In other words, the toggle link 68 toggles between the opposite sides of the forward toggle line relative to the corresponding hinge axis of the forward louver door 54.

Correspondingly, for the aft toggle link, the left distal end thereof is laterally offset radially outwardly in the outboard direction of its horizontal toggle line in the stowed position of the door, and oppositely laterally offset radially inwardly of its toggle line in the deployed position of the aft louver door. The aft toggle link 68 therefore similarly toggles between the opposite sides of the aft toggle line between the stowed and deployed positions of the aft louver door 56.

The forward and aft toggle links 68 are preferably telescopic and vary in length as they are toggled during operation. The toggle links are suitably configured for requiring increasing compression force as their lengths decrease between their opposite proximal and distal ends, by using an internal compression spring for example.

As indicated above, the two louver doors 54,56 cooperate with the inner blocker door 58 using the corresponding drive links 60 therebetween. Each of the two louver doors 54,56 as disclosed above may be independently locked or latched using the corresponding toggle link 68 as the louver and blocker doors are stowed.

Whereas the toggle links described above are passive devices for latching closed the louver doors upon stowing thereof, an additional level or redundancy to latch closed the louver doors is required for meeting government certification requirements. Active latching of the louver doors may be effected as described further hereinbelow with a relatively simple system with enhanced durability for securely latching closed the louver doors notwithstanding the aerodynamic or mechanical opening or closing loads thereon.

As initially illustrated in FIG. 4, each of the forward louver doors 54 includes a latch pin 70 fixedly mounted to the middle of the forward distal end of the door and extending radially inwardly. The pin itself is oriented in the circumferential direction, and is suitably mounted between two side plates in an integrated bracket mounted to the underside of the leading edge lip of the forward louver door.

FIG. 2 illustrates the forward louver door latched closed, with FIG. 3 illustrating unlatching thereof for thrust reverser operation. Each of the latch pins 70 cooperates with a complementary rotary latch hook 72 pivotally mounted to the nacelle.

The latch hook has a latched or closed rotary position as illustrated in FIG. 2 which engages the latch pin 70 therein for locking or latching closed the forward louver door 54 in the outer skin. The latch hook also has an opposite open or unlatched rotary position as illustrated in FIG. 3 which permits the latch pin 70 to disengage therefrom as the forward reverser door 54 is deployed radially outwardly.

An actuator-driven rotary cam may be mounted on the front side of the rotary latch to lock it closed in FIG. 2, while also permitting the latch to unlock in FIG. 3.

The spider actuation system 62 introduced above is specifically configured for simultaneously deploying all the thrust reverser doors using relatively little force and relatively little stroke. This is effected in part by kinematically mounting the forward door 54 illustrated in FIGS. 2 and 3 for requiring little axial displacement thereof for achieving the large pivotal movement between the stowed and deployed positions.

In particular, each of the forward doors 54 includes a pivot axis or joint 74 disposed at an intermediate axial position between the leading and trailing edges thereof so that the leading edge of the door is deployed radially outwardly as the trailing edge of the door is deployed radially inwardly as illustrated in FIG. 3. FIG. 4 illustrates in more particularity two of the pivot joints 74 defining the common pivot axis for deploying radially outwardly the forward door 54.

Each forward door 54 preferably also includes a drive bracket or clevis 76 mounted between the two pivot joints 74 which is fixedly mounted to the inner surface of the door slightly aft of the pivot axis. In this way, by pulling forwardly the drive clevis 76 the forward door 54 illustrated in FIG. 2 may be deployed radially outwardly as illustrated in FIG. 3. And, by pushing the drive clevis aft the deployed forward door 54 illustrated in FIG. 3 is pivoted forwardly to its stowed position as illustrated in FIG. 2.

Figures 5, 6:
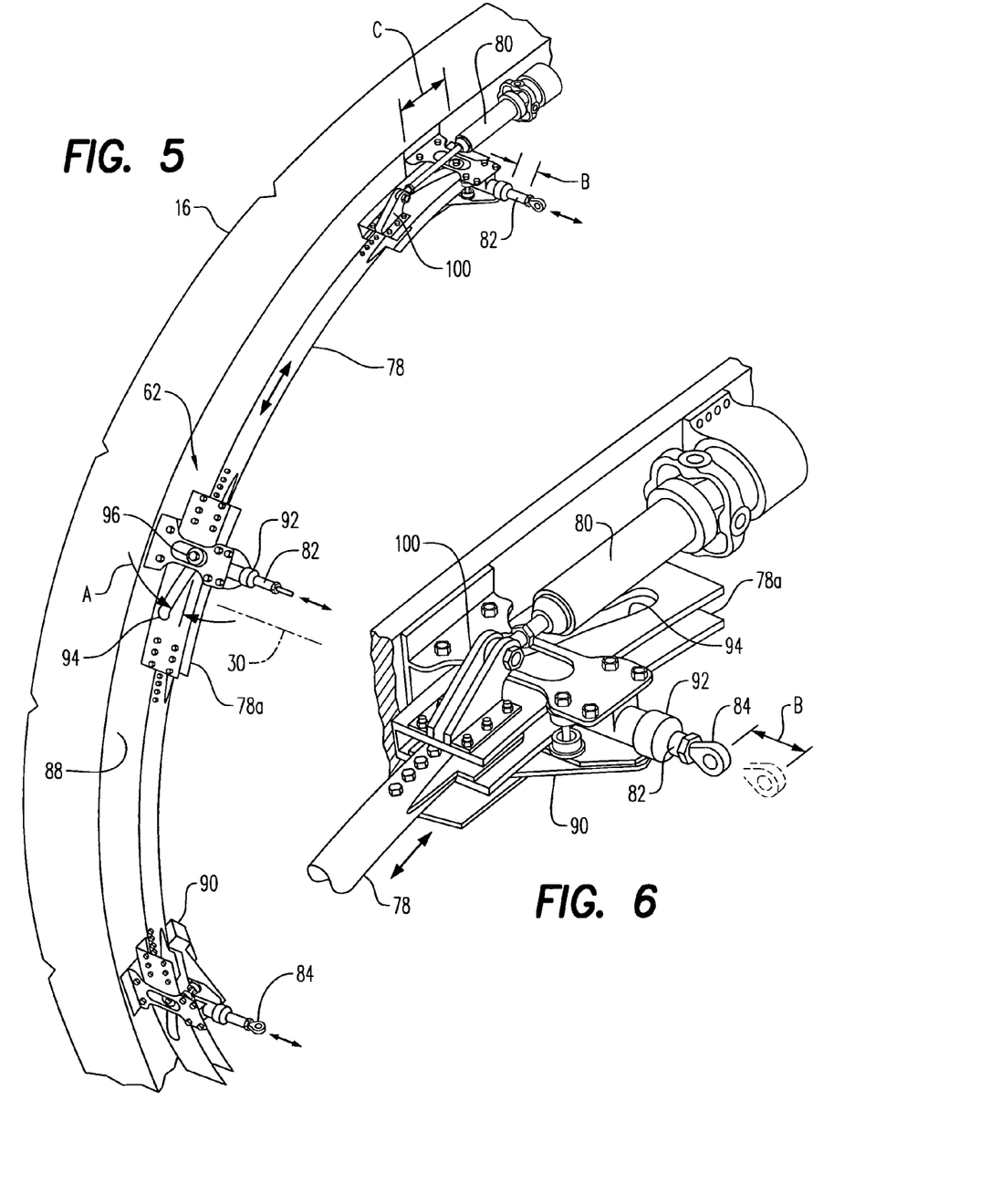
FIG. 5 is an isometric view of the actuation system illustrated in FIGS. 2 and 3 shown in isolation from the reverser doors.
FIG. 6 is an enlarged isometric view of the actuator for driving the yoke illustrated in FIG. 5.

The actuation system 62 to effect this motion is illustrated in more detail in FIGS. 5 and 6. This system includes an arcuate peripheral bar or yoke 78 disposed coaxially around the centerline axis 30 of the nacelle 16. Since the nacelle is typically formed in two C-duct sections, two identical actuation systems 62 are provided in both halves of the nacelle, with each yoke extending suitably less than the 180 degree semi-circumference thereof.

A single or common linear actuator 80 is suitably mounted tangentially to the yoke 78 for rotary movement of the yoke circumferentially about the centerline axis 30. The actuator may have any conventional configuration, and may be electrical, pneumatic, or hydraulic, with an extendable output rod.

A plurality of drive or spider rods 82 are spaced circumferentially apart around the common yoke 78 for simultaneously actuating corresponding ones of the forward reverser doors 54. Each rod has a proximal end suitably joined to the yoke 78, and an opposite distal end extends axially from the yoke and includes a suitable drive fitting 84 thereon.

As shown in FIGS. 2-4, the drive fitting 84 of the spider rod 82 is joined to the drive clevis 76 on each forward door using a short idler link 86 which accommodates differential radial movement between the rod 82 and the drive clevis 76 as the forward door 54 is pivoted between its deployed and stowed positions.

The full set of spider rods 82, three for example as illustrated in FIG. 5, extend axially or parallel to centerline axis 30 of the nacelle and extend axially aft from the common yoke 78 for simultaneously pivoting the corresponding forward reverser doors 54 as the common actuator 80 rotates the yoke circumferentially. In this way, the common yoke 78 provides synchronous axial deployment of the spider rods 82 for simultaneously pivoting the set of forward reverser doors in each C-duct.

The actuation system 62 illustrated in FIG. 5 is suitably supported inside the nacelle 16 from a common radial frame 88 which is itself fixedly mounted in the nacelle. A plurality of local frames or stanchions 90 are fixedly mounted to the radial frame 88 at respective ones of the spider rods 82. The stanchions support the yoke 78 and permit circumferential rotary movement thereof, while also supporting the actuator drive rods 82 and permitting axial translation thereof.

For example, each of the spider rods 82 illustrated in FIGS. 5 and 6 is slidably mounted in tubular housing 92, which housing itself is fixedly joined to the corresponding stanchion 90 axially perpendicularly aft from the common yoke 78.

Figure 7:
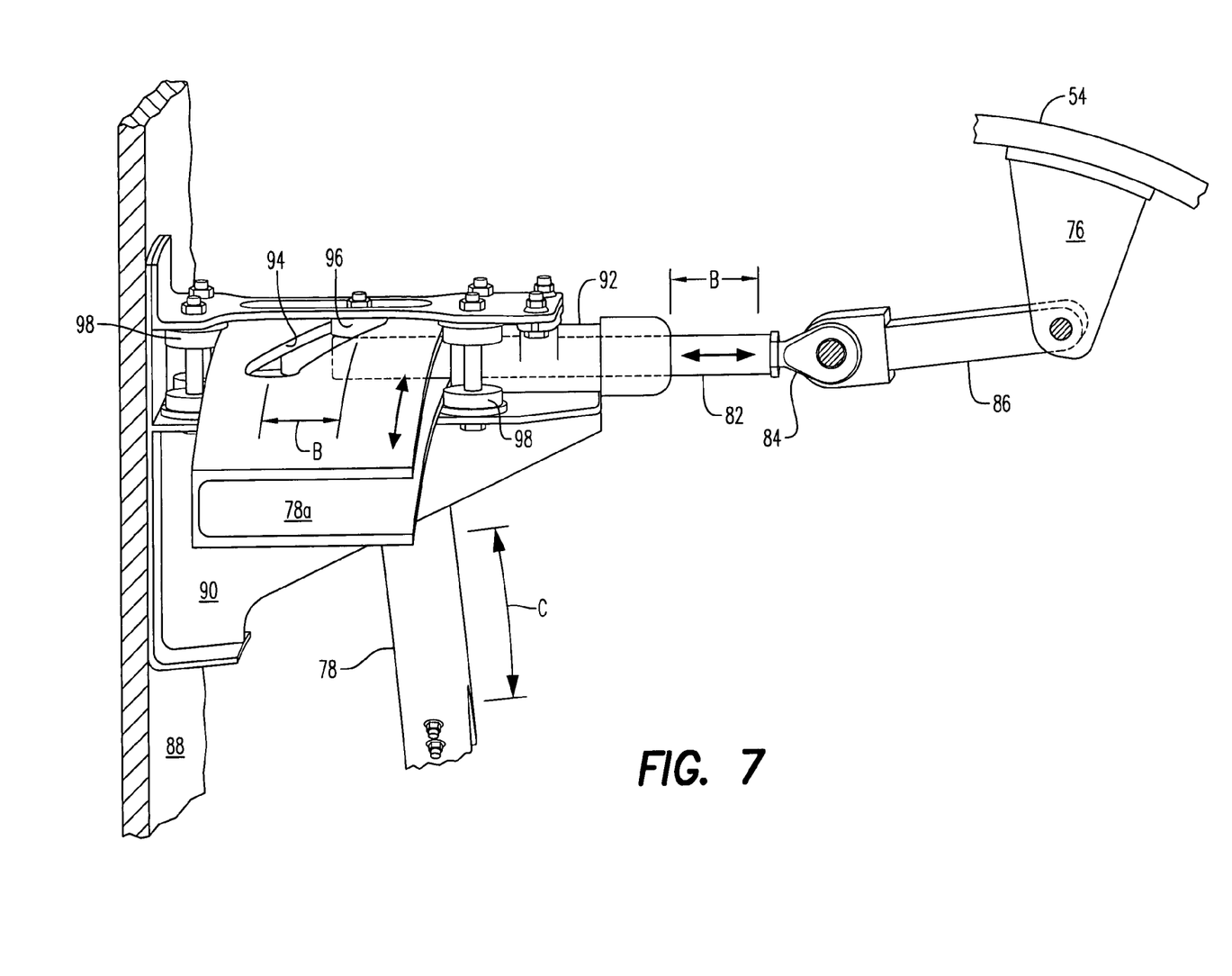
FIG. 7 is a partly sectional, isometric view of an exemplary portion of the actuation system illustrated in FIG. 2 with extended rod for stowing closed the reverser doors as illustrated in FIG. 2.
Figure 8:
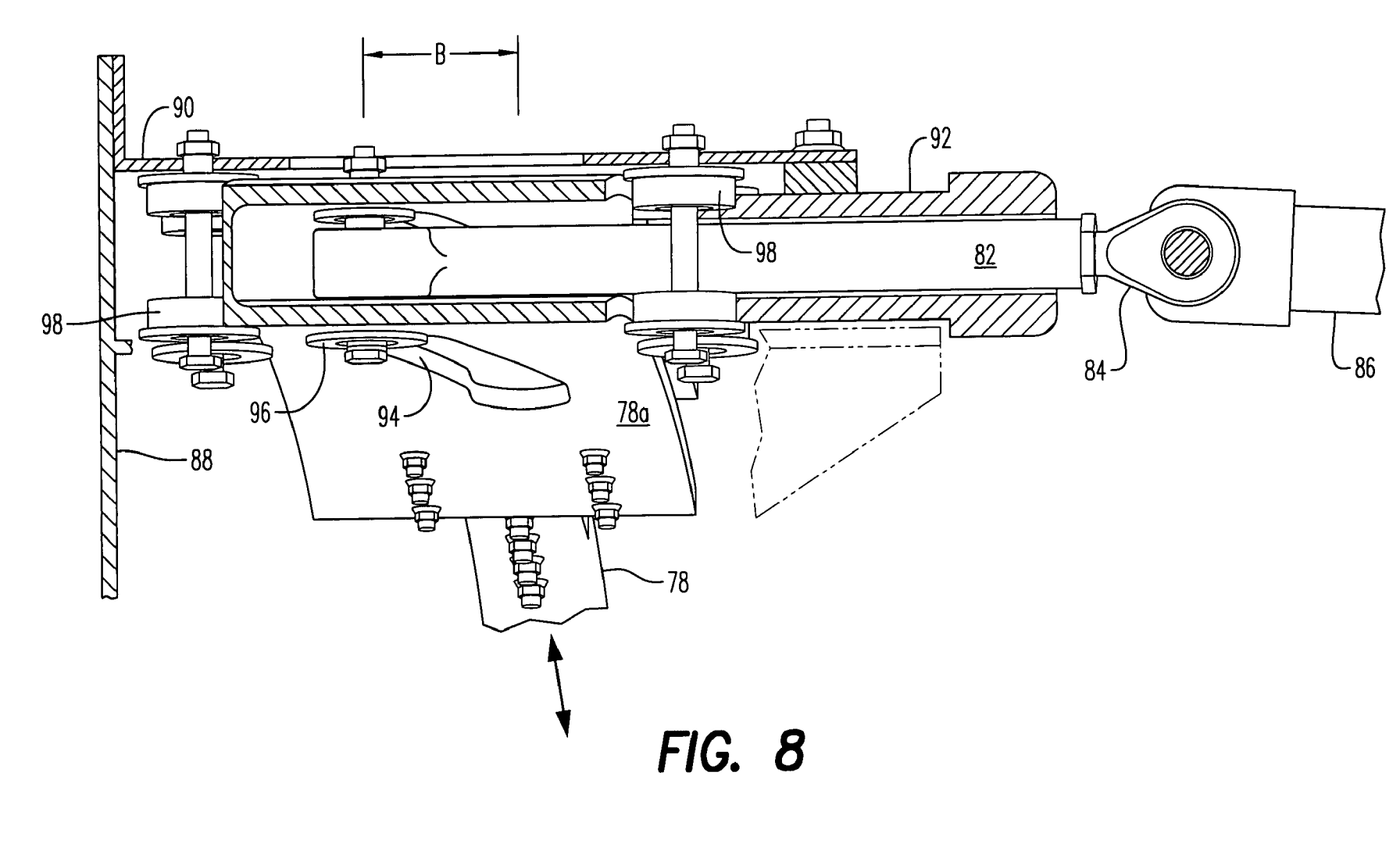
FIG. 8 is a partly sectional, axial view, like FIG. 7, of the actuation system including the retracted rod for deploying open the reverser doors as illustrated in FIG. 3.

As shown in FIGS. 7 and 8, the yoke 78 includes an inclined circumferential drive slot 94 at each of the spider rods 82, and each of the spider rods includes a complementary drive roller 96 at the proximal end thereof disposed in a respective one of the drive slots. As the yoke is rotated during operation, the drive slots 94 engage the drive rollers 96 for driving each rod in axial translation to pivot the attached reverser doors.

As initially illustrated in FIG. 5, the yoke 78 may have any suitable configuration, such as a hollow tubular component, and preferably includes local rectangular spider channels 78a slidingly supported in each of the stanchions 90 for receiving corresponding ones of the spider rods. As illustrated in more detail in FIGS. 7 and 8, each channel 78a has radially inner and outer arcuate plates joined together at a radially extending base at the forward end thereof forming a generally U-shaped cross section, being open at the aft end thereof.

Each plate of the channel includes one of the drive slots 94 therein which receives a corresponding drive roller 96 joined to the proximal end of the spider rod 82. In this way, as the channel 78a rotates circumferentially around the stanchions, the drive slots 94 engage the drive rollers 96 for reducing friction therewith and carrying axial force through the several spider rods 82 to pivot the reverser doors.

Figure 9:
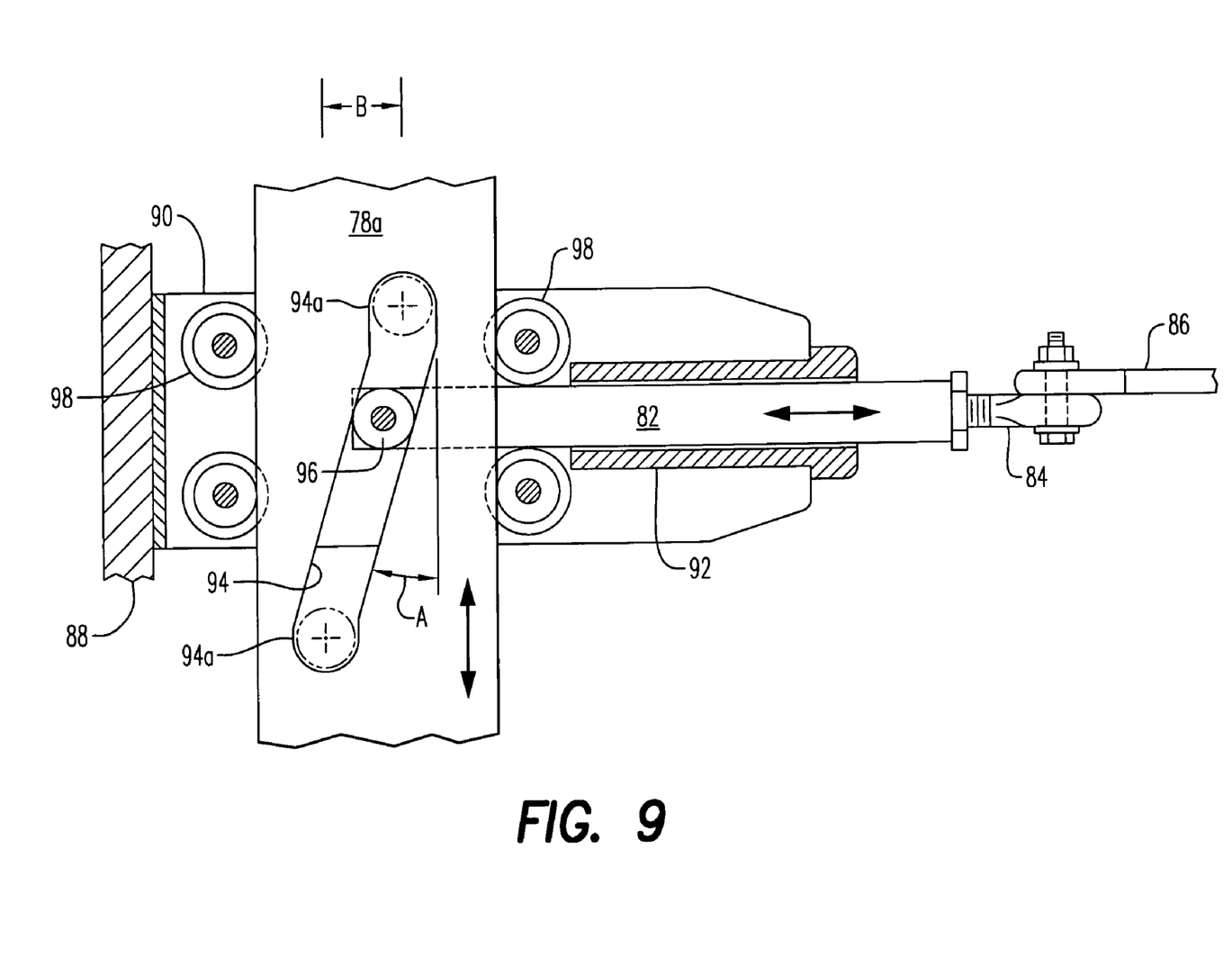
FIG. 9 is a top, partly sectional view of the actuation system illustrated in FIGS. 7 and 8 with the rod being disposed at an intermediate axial position between extended and retracted.

The channels 78a are mounted in the stanchions 90 for low friction rotary movement by a plurality of guide rollers 98. FIGS. 7-9 illustrate two sets of four guide rollers 98 mounted on opposite axial sides of the channel 78a to simultaneously support the inner and outer plates thereof along their forward and aft ends. Each of the guide rollers 98 includes a suitable lip to trap and suspend radially the channel 78a on each stanchion.

In this way, the common yoke 78 is mounted at each of the circumferentially spaced apart stanchions by the guide rollers 98 mounted therein for trapping each channel 78 axially and radially and permitting low friction circumferential rotary movement thereof.

The guide rollers 98 illustrated in FIG. 7 are mounted in radial pairs with a common fastener extending therethrough. The fasteners are fixedly joined to inner and outer supporting plates of the stanchion. The two drive rollers 96 are mounted at the proximal end of the spider rod 82 by another fastener extending radially therethrough. The head and nut ends of this fastener may extend radially through axial extending cutout slots in the two stanchion plates for permitting unrestrained axial movement of the spider rod 82 as the yoke channel 78a rotates circumferentially inside each stanchion.

In this configuration, the drive slots 94 are disposed in the top and bottom channel plates for receiving the corresponding drive rollers 96 therein. The corresponding spider rods 82 then extend axially aft and outwardly through the open ends of the channels toward the respective reverser doors. The rod housings 92 are fixedly joined to the stanchions for maintaining axial orientation of the corresponding spider rods 82 perpendicular to the plane of the arcuate yoke 78.

As illustrated in FIGS. 5 and 9, the drive slots 94 extend circumferentially along the channel plates with an acute inclination angle A for leveraging axial translation of the rods 82 with circumferential rotation of the common yoke 78.

As initially illustrated in FIG. 9, the circumferential inclination of the drive slot 94 controls the axial position of the drive rollers 96 and determines the total axial stroke B of each spider rod 82. The diameter of each drive roller 96 is slightly less than the width of the drive slot 94 so that the forward side of the slot 94 pushes the spider rod 82 aft, and the right side of the drive slot 94 pushes the spider rod 82 forward as the yoke rotates.

The axial translation of the spider rod 82 illustrated in FIG. 9 is effected by the circumferential motion of the yoke, which circumferential motion effects a circumferential stroke C as illustrated in FIG. 5. FIGS. 5 and 7 illustrate tangential extension of the output rod of the common drive actuator 80, which in turn rotates the yoke 78 to drive the roller 96 to its extreme forward position in the drive slot 74 which in turn fully extends the spider rods 82 in the aft axial direction.

FIG. 6 illustrates retraction of the output rod of the common actuator 80 which in turn retracts the yoke 78 in the opposite direction and drives the roller 96 to the other end of the slot 94 as illustrated in FIG. 8 at its extreme forward axial position therein. The spider rods 82 are in turn fully retracted inside their housings 92.

Accordingly, the axial stroke B of each of the spider rods 82 is directly related to the circumferential stroke C of the common yoke 78 as determined by the specific value of the inclination angle A.

The inclination angle A of the drive slots 94 is preferably shallow and less than or equal to 45 degrees for effecting greater circumferential stroke C of the yoke 78 than axial stroke B of the rods 82. In this way, the axial stroke of the rods 82 may be minimized for reducing the size of the linkages which pivot the reverser doors, while taking advantage of the substantial circumferential stroke capability of the arcuate yoke 78.

Correspondingly, the inclination angle A of the drive slots 94 is preferably less than 45 degrees for amplifying circumferential force in the yoke 78 from the single actuator 80 into greater axial force in the several spider rods 82. The cam action of the inclined drive slots 94 provide a simple and effective mechanical force leverage which offsets stroke length. Force amplification may be obtained at the expense of increased circumferential stroke, with the decreased axial stroke of the spider rods 82 being used to advantage for increasing the speed of deployment and retraction of the reverser doors.

As indicated above, the inclination angle of the drive slots 94 may be less than or equal to 45 degrees. The axial stroke B of the spider rods 82 illustrated in FIG. 5 is proportional to the circumferential stroke C of the yoke 78 by the tangent of the inclination angle A. Since the tangent of 45 degrees equals 1.0, then inclination angles less than 45 degrees will effect more circumferential stroke C relative to the axial stroke B.

Correspondingly, the force amplification is also proportional to the inverse of the tangent of the inclination angle A, with relatively little force being required from the actuator 80 in the circumferential direction of the yoke 78 for in turn effecting a substantial increase or amplification of force in the axial direction along the spider rods 82.

For an inclination angle of about 26.5 degrees for the drive slots 94, the force amplification ratio is 2.0, which corresponds with twice the amount of circumferential stroke C as axial stroke B.

In a preferred embodiment, the inclination angle A of the drive slots 94 is about 10 degrees for effecting a force amplification ratio of about 5.7, with a corresponding larger circumferential stroke relative to the axial stroke. And, as the inclination angle decreases below 10 degrees, force amplification further increases as circumferential stroke also further increases.

In this configuration, the axial stroke B required to fully deploy the forward reverser doors may be set at about 50 mm or less by the relative positions of the pivot joint 74 and the drive clevis 76. The corresponding circumferential stroke C may be controlled by the particular value of the inclination angle A from one to ten times the axial stroke B. By selecting the inclination angle A of 10 degrees, the circumferential stroke C is about 5.7 times the axial stroke B, which is about 284 mm in the above example. And, the force amplification is correspondingly 5.7 times which permits a relatively small common actuator 80 to develop sufficient force for driving simultaneously all the spider rods 82 joined to the common yoke 78.

For the three spider rods 82 illustrated in FIG. 5, each would require the same axial force requirement for pivoting their respective reverser doors. By utilizing a shallow inclination angle A of less than equal to about 10 degrees, for example, the sum of those three forces may be readily obtained by a small fraction thereof in the common actuator 80. The fraction is represented by the tangent of 10 degrees, which is about 0.18.

Accordingly, the actuator 80 may be relatively small, with relatively small stroke itself, and with relatively small output force requirement which correspondingly reduces its weight and cost. However, the single actuator 80 will nevertheless be effective for driving all three spider rods 82 with amplified force sufficient for pivoting the reverser doors over the even smaller axial stroke required therefor by the kinematic mounting of the doors. And, precise pivoting control of those doors is obtained by the correspondingly larger circumferential stroke of the yoke.

As shown in FIG. 9, each of the drive slots 94 preferably includes detent notches 94a at opposite circumferential ends thereof which extend circumferentially parallel to each other and with the circumferential orientation of the yoke 78. Whereas the main slot 94 is positioned obliquely to the spider rods 82 for imparting forward and aft axial force therein, the notches 94a are disposed perpendicular to the rods 82 and prevent relative movement between the circumferential yoke and the axial rods 82 when the rollers 96 are disposed therein.

In this way, when the drive rollers 96 are located at either end of the drive slot 94 in the respective detent notch 94a the rods 82 are locked in axial position either fully extended or fully retracted.

In the fully extended position of the rods 82, the drive rollers 96 are trapped in the aft detent notches 94a which in turn adds redundancy to the locking mechanisms for stowing closed the thrust reverser doors. When the drive rollers 96 are trapped in the forward notches 94a the thrust reverser doors are locked open, and the various loads acting on the doors are carried in part axially through the common yoke 78 into the nacelle frame.

However, by simply rotating the yoke 78 the drive rollers 96 freely leave the circumferentially oriented detent notches 94a and enter the inclined main slots 94 whose forward and aft sides provide cam ramps which convert the circumferential force into axial components of force for extending or retracting the spider rods 82.

In the exemplary embodiment illustrated in FIG. 5, the common yoke 78 extends in circumferential length suitably less than the 180 degree extent of the C-duct nacelle half to commonly drive the three sets of thrust reverser doors in unison. Accordingly, the common yoke 78 includes three of the spider channels 78a distributed at opposite circumferential ends of the yoke and in the middle thereof.

Correspondingly, the single drive actuator 80 is fixedly mounted to the radial frame 88 and includes an output rod extending tangentially to the yoke and joined to a supporting bracket 100 fixedly mounted on the end channel 78a located at the proximal end of the yoke. The opposite, distal end of the common yoke 78 extends freely from the third stanchion 90 which supports this end.

The spider mechanism 62 illustrated in FIG. 5 is reproduced in mirror image on the opposite C-duct of the fan nacelle for similarly driving in unison the three sets of thrust reverser doors in that half of the fan nacelle.

The spider actuation mechanism disclosed above enjoys many advantages in deploying and retracting the bifold door thrust reverser. The close mounting of the pivot joint 74 and drive bracket 76 for the forward louver doors permits large angular deployment thereof with minimal axial stroke of the spider rods 82, which may be as little as about 50 mm.

The multiple sets of reverser doors may be accurately driven in unison using the axial spider rods driven by the common circumferential yoke using a single actuator.

The drive slot interconnection between the yoke and spider rods enjoys substantial mechanical leverage in which small stroke and large force may be obtained in each of the spider rods with correspondingly large circumferential stroke and small force in the yoke and single drive actuator. The circumferential orientation of the yoke permits relatively large circumferential stroke which is converted to relatively small axial stroke in each of the spider rods. And, this mechanical advantage also permits the use of a relatively small actuator to develop suitably larger force as required to drive the several spider rods in unison.

Operation of the several gangs of thrust reverser doors is inherently synchronized using the common yoke and spider rods, with a single small actuator instead of using individual large actuators for each of the reverser door sets. Pivoting of the reverser door sets has substantially improved accuracy since the small axial stroke required therefor is obtained by correspondingly larger circumferential stroke of the common yoke.

Since actuators are inherently heavy and expensive for large force requirements, a substantial reduction in weight and cost may be obtained by using the single small actuator for driving the common yoke, which in turn drives the multiple spider rods joined thereto. The spider mechanism therefore enjoys substantial weight and cost savings, as well as providing improved reliability and control for operation of the thrust reverser doors.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which I claim:

The invention claimed is:

1. An actuation system for simultaneously moving a plurality of circumferentially spaced apart thrust reverser doors comprising:
   an arcuate yoke having an axial centerline axis;
   an actuator mounted tangentially to said yoke for rotary movement of said yoke circumferentially around said centerline axis; and
   a plurality of circumferentially spaced apart spider rods, each having a proximal end joined to said yoke and a drive fitting at an opposite distal end extending axially from said yoke, for simultaneously moving said plurality of reverser doors as said yoke rotates.

2. A system according to claim 1 further comprising:
   a plurality of stanchions supporting said yoke at respective ones of said rods; and each of said rods being mounted in a tubular housing fixedly joined to said stanchions.

3. A system according to claim 2 wherein said yoke includes an inclined circumferential drive slot at each of said rods, and each of said rods includes a drive roller at said proximal end disposed in a respective one of said drive slots for driving said rod in translation as said yoke and drive slots are driven circumferentially.

4. A system according to claim 3 wherein:
said yoke further includes a rectangular channel at each of said stanchions having radially inner and outer plates joined to a base at one end and being open at an opposite end;
each of said stanchions includes a plurality of guide rollers trapping said channel axially and radially for circumferential movement thereof; and
said drive slots are disposed in said channel plates for receiving said drive rollers therein, with said rods extending axially outwardly through a respective oven end of said channels.

5. A system according to claim 4 wherein said drive slots extend circumferentially along said channel plates with an acute inclination angle for leveraging axial translation of said rods with circumferential rotation of said yoke.

6. A system according to claim 5 wherein said inclination angle of said drive slots is shallow for effecting greater circumferential stroke of said yoke than axial stroke of said rods.

7. A system according to claim 5 wherein said inclination angle of said drive slots is shallow for amplifying circumferential force in said yoke from said actuator into greater axial force in said rode.

8. A system according to claim 5 wherein said inclination angle of said drive slots is up to about 10 degrees.

9. A system according to claim 5 wherein each of said drive slots further includes detent notches at opposite circumferential ends thereof extending circumferentially parallel to each other and with said yoke.

10. A system according to claim 5 wherein:
said yoke includes three of said channels distributed at opposite circumferential ends and in the middle of said yoke; and
said actuator includes an output rod joined to a bracket mounted on said channel at a proximal end of said yoke.

11. A system according to claim 1 further comprising:
a nacelle including a plurality of circumferentially spaced apart thrust reverser doors pivotally mounted therein;
a radial frame fixedly mounted in said nacelle;
a plurality of stanchions fixedly mounted to said frame at respective ones of said rods;
each of said rods being mounted in a housing fixedly joined to said stanchions; and
each of said rods having a proximal end joined to said yoke and a drive fitting at an opposite end joined to a respective one of said doors, and said rods extend axially from said yoke for simultaneously pivoting said doors as said actuator rotates said yoke.

12. A system according to claim 11 wherein said yoke includes an inclined circumferential drive slot at each of said rods, and each of said rods includes a drive roller at said proximal end disposed in a respective one of said drive slots for driving said rod in translation as said yoke and drive slots are driven circumferentially.

13. A system according to claim 12 wherein:
said yoke further includes a rectangular channel at each of said stanchions having radially inner and outer plates joined to a base at one end and being open at an opposite end;
each of said stanchions includes a plurality of guide rollers trapping said channel axially and radially for circumferential movement thereof; and
said drive slots are disposed in said channel plates for receiving said drive rollers therein, with said rods extending axially outwardly through a respective open end of said channels.

14. A system according to claim 13 wherein said drive slots extend circumferentially along said channel plates with an acute inclination angle for leveraging axial translation of said rods with circumferential rotation of said yoke.

15. A system according to claim 14 wherein each of said drive slots further includes detent notches at opposite circumferential ends thereof extending circumferentially parallel to each other and with said yoke.

16. A system according to claim 15 wherein:
each of said doors includes a pivot joint disposed intermediate leading and trailing edges thereof for deploying radially outwardly said leading edge of said door; and
each door further includes a drive bracket fixedly mounted aft of said pivot joint, and joined to a distal end of a respective one of said rods by an idler link.

17. A system according to claim 16 wherein said inclination angle of said drive slots is shallow for effecting greater circumferential stroke of said yoke than axial stroke of said rods.

18. A system according to claim 17 wherein said inclination angle of said drive slots is up to about 10 degrees.

19. A system according to claim 17 wherein:
said yoke includes three of said channels distributed at opposite circumferential ends and in the middle of said yoke; and
said actuator is fixedly mounted to said frame, and includes an output rod joined to a bracket mounted on said channel at a proximal end of said yoke.

20. A method of simultaneously moving a plurality of circumferentially spaced apart thrust reverser doors comprising:
actuating circumferentially a common yoke;
converting circumferential rotation of said yoke into axial translation of a plurality of spider rods joined to respective ones of said doors; and
pivoting said doors by axial translation of said spider rods.

21. An actuation system for simultaneously moving a plurality of circumferentially spaced apart thrust reverser doors comprising:
an arcuate yoke having an axial centerline axis;
a plurality of circumferentially spaced apart spider rods, each having a proximal end joined to said yoke and a drive fitting at an opposite distal end extending axially from said yoke for moving a respective one of said doors;
means for rotating said yoke circumferentially around said centerline axis; and
means for converting said circumferential rotation of said yoke into translation of said rods for simultaneously moving said doors.

\* \* \* \* \*

UNITED STATES PATENT AND TRADEMARK OFFICE
CERTIFICATE OF CORRECTION

| | |
|---|---|
| PATENT NO. | : 7,264,203 B2 |
| APPLICATION NO. | : 10/955662 |
| DATED | : September 4, 2007 |
| INVENTOR(S) | : Jean-Pierre Lair |

It is certified that error appears in the above-identified patent and that said Letters Patent is hereby corrected as shown below:

Column 9, line 15, after "less than" insert -- or --.
Column 11, line 19, claim 4, delete "oven" and substitute therefor -- open --.

Signed and Sealed this

Eighteenth Day of December, 2007

JON W. DUDAS
*Director of the United States Patent and Trademark Office*